United States Patent Office 2,732,405
Patented Jan. 24, 1956

2,732,405

METHOD FOR PRODUCING A HEXADECAHYDROCHRYSENE COMPOUND

Raymond M. Dodson, Park Ridge, and Paul B. Sollman, Evanston, Ill., assignors to G. D. Searle & Co., Chicago, Ill., a corporation of Illinois No Drawing. Application October 1, 1952,
Serial No. 312,652

1 Claim. (Cl. 260—586)

The present invention relates to a new hexadecahydrochrysene derivative and more particularly to the 1 - (β - hydroxyacetyl) - 1 - hydroxy - 10a,12a - dimethyl-1,2,3,4,4a,4b,5,6,8,9,10,10a,10b,11,12,12a - hexadecahydrochrysen-8-one which can be represented by the structural formula

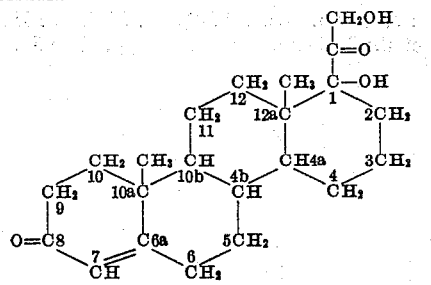

This compound was conveniently prepared from the 1 - vinyl - 1-hydroxy-10a,12a-dimethyl-1,2,3,4,4a,4b,5,6,8,9,10,10a,10b,11,12,12a-hexadecahydrochrysen - 8 - one which is described in our copending application, Serial No. 288,032, filed May 15, 1952, now abandoned.

The conversion is conveniently carried out in a one step reaction by treatment with hydrogen peroxide and a metallic oxide such as osmium tetroxide in an organic solvent under anhydrous conditions at room temperature.

Among the solvents which are conveniently used in this reaction are lower alkanols and particularly such lower tertiary alkanols as tertiary butanol and pentanol.

The claimed compound is valuable in providing a medicinal agent for the treatment of hormonal imbalance and particularly in the correction of pathological electrolyte imbalance. A special field of utility consists in its use as a starting material in the biochemical preparation of 11-hydroxy and 11-oxo derivatives which have valuable neoglycogenetic activities.

The example below illustrates in detail one of the preferred procedures used for the practice of this invention. However, the invention is not to be construed as limited thereby in spirit or in scope since it is obvious that many modifications in materials and methods may be practiced without departing from the invention. In this example temperatures are given in degrees centigrade (° C.) and relative amounts of material in parts by weight.

8 parts of 8β-hydroxy-10a,12a-dimethyl-1,2,3,4,4a,4b,5,7,8,9,10,10a,10b,11,12,12a - hexadecahydrochrysen - 1-one are dissolved in 285 parts of anhydrous ether and 175 parts of anhydrous benzene. In the course of one hour a suspension prepared by dissolving 6.4 parts of potassium in 97 parts of dry tertiary amyl alcohol is added dropwise. Acetylene is bubbled into the solution during the addition and for 4 more hours, after which the solution is shaken with 500 parts of a saturated solution of ammonium chloride. The organic solution is separated, washed with water and evaporated in vacuo, leaving as a residue the 1-ethynyl-10a,12a-dimethyl-1,2,3,4,4a,4b,5,7,8,9,10,10a,10b,11,12,12a - hexadecahydrochrysene-1,8-diol which, recrystallized from methanol, melts at about 250–253° C. An 0.5% chloroform solution shows an optical rotation of $[\alpha]_D^{25} = -108°$. It has the structural formula

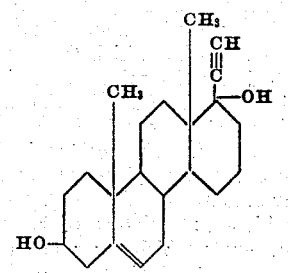

A solution of 30 parts of 1-ethynyl-10a,12a-dimethyl-1,2,3,4,4a,4b,5,7,8,9,10,10a,10b,11,12,12a - hexadecahydrochrysene-1,8-diol, 100 parts of cyclohexanone and 30 parts of aluminum isopropoxide in 1000 parts of toluene is heated at reflux temperature for an hour and then treated with water and 500 parts of a saturated solution of sodium potassium tartrate. The mixture is steam distilled in the course of an hour and the separating precipitate is dried under vacuum and crystallized from aqueous dioxane. The 1-ethynyl-1-hydroxy-10a,12a-dimethyl-1,2,3,4,4a,4b,5,6,8,9,10,10a,10b,11,12,12a - hexadecahydrorchrysen-8-one thus obtained melts at about 282–284° C. It has the structural formula

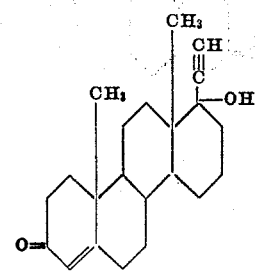

A solution of 54 parts of this compound in 2000 parts of anhydrous dioxane and 200 parts of pyridine is hydrogenated at atmospheric pressure in the presence of a calcium carbonate-supported palladium catalyst. After addition of the theoretical amount of hydrogen, the reaction mixture is filtered and the filtrate is freed from solvent by vacuum distillation. There is thus obtained the 1-vinyl - 1 - hydroxy - 10a,12a - dimethyl - 1,2,3,4,4a,4b,5,6,8,9,10,10a,10b,11,12,12a - hexadecahydrochrysen - 8-one which is recrystallized from a mixture of benzene and petroleum ether. The resulting crystals melt at about 152–154° C. The compound shows a specific optical rotation of $[\alpha]_D^{25} = +107°$ when determined in 1% methanol solution and has the structural formula

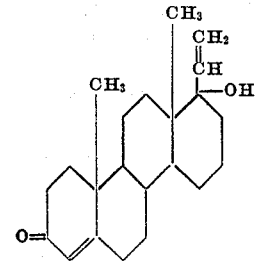

A solution of 329 parts of 1-vinyl-1-hydroxy-10a, 12a-dimethyl - 1,2,3,4,4a,4b,5,6,8,9,10,10a,10b,11,12,12a-hexadecahydrochrysen-8-one in 4000 parts of tertiary butanol is treated with 1080 parts of a 1.6 molar solution of hydrogen peroxide in tertiary butanol under anhydrous conditions. To the resulting solution a solution of 8 parts of osmium tetroxide and 800 parts of anhydrous tertiary butanol is added and the solution is permitted to stand at room temperature for 18 hours. The reaction mixture is poured into water and stripped of solvent. The residue is suspended in water and extracted twice with chloroform. The combined chloroform extracts are washed with water and then twice with dilute sodium bicarbonate solution. The chloroform solution is dried with sodium sulfate, filtered and evaporated. The methanol solution of the residue is treated with an aqueous solution of sodium sulfite after which the solution is heated on the steam bath for 30 minutes. It is then diluted with water and extracted with chloroform. The chloroform extract is dried over anhydrous sodium sulfate, filtered and evaporated. The residue is dissolved in a mixture of benzene and ethyl acetate and applied to a chromatography column containing 10,000 parts of silica gel. Elution with a 3:2 mixture of benzene and ethyl acetate gives an eluate which, on evaporation, yields 1-($\beta$ - hydroxyacetyl) - 1 - hydroxy - 10a,12a - dimethyl-1,2,3,4,4a,4b,5,6,8,9,10,10a,10b,11,12,12a - hexadecahydrochrysen-8-one. Upon recrystallization from dilute methanol clusters of beautiful needles are obtained which melt at about 201–205° C. This compound has the structural formula

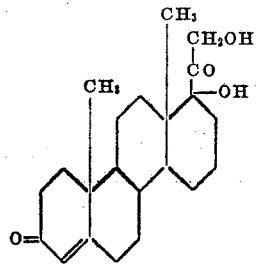

It gives a positive blue tetrazolium test. Its infrared spectrum in chloroform solution shows a very strong maximum at 6.03; strong maxima at 5.875 and 9.61; medium strong maxima at 6.21, 6.925, 7.24, 7.875 and 9.30; and weak maxima at 2.775, 2.85 to 2.88, 7.375 to 7.40, 7.525, 9.83 to 9.87 and 11.15 to 11.17 microns.

We claim:

The preparation of 1-($\beta$-hydroxyacetyl)-1-hydroxy-10a, 12a - dimethyl - 1,2,3,4,4a,4b,5,6,8,9,10,10a,10b,11,12,12a - hexadecahydrochrysen - 8 - one which comprises the treatment of 1 - vinyl - 1 - hydroxy - 10a,12a - dimethyl - 1,2,3,4,4a,4b,5,6,8,9,10,10a,10b,11,12,12a - hexadecahydrochrysen-8-one with hydrogen peroxide and osmium tetroxide in an anhydrous organic solvent.

References Cited in the file of this patent

UNITED STATES PATENTS

| | | |
|---|---|---|
| 2,351,637 | Ruzicka et al. | June 20, 1944 |
| 2,357,364 | Stavely | Sept. 5, 1944 |
| 2,437,564 | Serini et al. | Mar. 9, 1948 |

OTHER REFERENCES

Spring: J. Chem. Soc. (1950), pp. 3352 to 3357.
Cook et al.: J. Chem. Soc. (1950), pp. 47 to 54.